A. B. DISS.
CASTER FOR TUBULAR LEGS FOR FURNITURE.
APPLICATION FILED APR. 30, 1908.
911,213.
Patented Feb. 2, 1909.
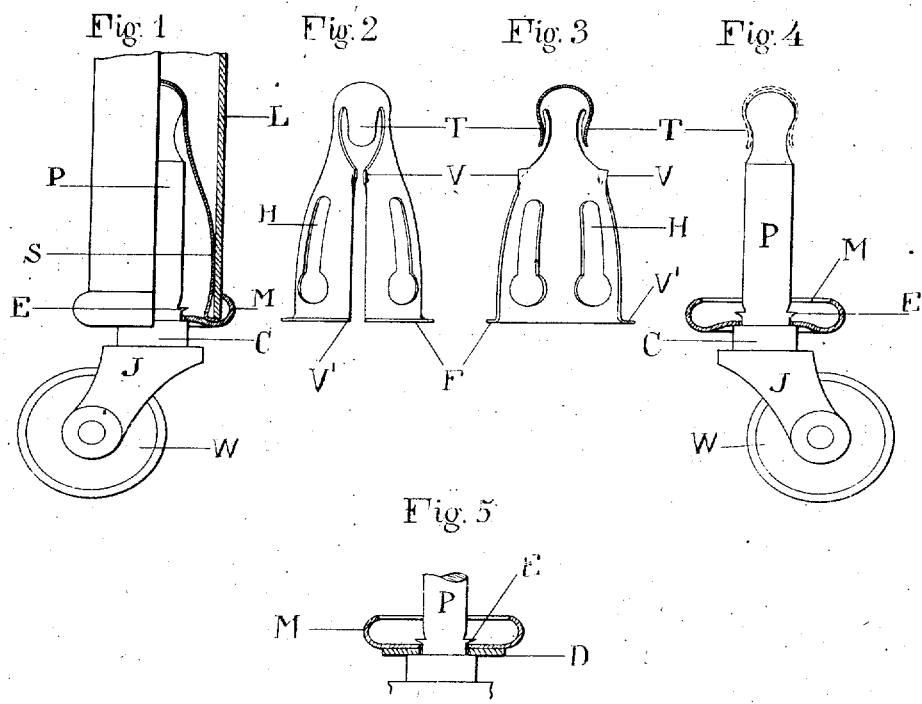

UNITED STATES PATENT OFFICE.

ALBERT B. DISS, OF NEWARK, NEW JERSEY, ASSIGNOR TO UNIVERSAL CASTER & FOUNDRY COMPANY, A CORPORATION OF NEW JERSEY.

CASTER FOR TUBULAR LEGS FOR FURNITURE.

No. 911,213.     Specification of Letters Patent.     Patented Feb. 2, 1909.

Application filed April 30, 1908. Serial No. 430,135.

*To all whom it may concern:*

Be it known that I, ALBERT B. DISS, a citizen of the United States, residing at Newark, New Jersey, have invented certain new and useful Improvements in Casters for Tubular Legs for Furniture, of which the following is a specification, (Case 3,) accompanied by drawings.

The invention relates to the class of casters having sockets for receiving, supporting and holding the caster pintles within relatively large tubular legs which the casters are designed to support. It is customary to secure around the foot of tubular legs or to cast thereupon an annular ornamentation or ornamental collar which is termed a leg mount.

The object of the present invention is to produce an improved caster structure having a detachable socket adapted to fit within and be retained by the tubular leg and a leg mount which with the pintle of the caster is secured by such socket to the leg and preferably serves as a means for relatively centering the pintle and the foot of the leg.

In the accompanying drawings Figure 1 is a side view, partly in central section, showing one preferred embodiment of the invention. Fig. 2 is a side elevation of a socket member used in the construction shown in Fig. 1. Fig. 3 is a cross section of the same at right angles to Fig. 2. Fig. 4 is a detail view of the pintle and the leg mount, the latter in section. Fig. 5 is a view of a variation of the details shown in Fig. 4.

A portion of the tubular leg is shown at L with a caster embodying the invention inserted and held therein; W is the wheel; J the jaws; P the pintle of the caster; S is the socket which is shown in the form of a spring socket of well known type, preferably of steel; and I wish it to be understood that various forms of spring sockets may be selected in carrying out the invention. The spring socket is detachable from the pintle and has flanges F at the lower end which engage the end of the leg and prevent the socket being thrust in too far when they come against the end of the leg. The socket is made of sheet steel and is bowed or barrel shape slightly, as shown, the slits H facilitating this. The socket fits the leg tightly and is held firmly in place by the friction against the inner wall of the leg. It is slightly bowed or barrel shape to afford sufficient resilience to the frame to enable it to fit the slightly varying internal diameters of the tubular legs of the size for which it is designed. The two halves of the spring socket preferably have bearings against each other at the points V V' to increase the stiffness and strength. The pintle P is thrust into the socket and is held therein by the spring arms or leaves T which receive and engage the head and neck of the pintle, as indicated by the dotted lines in Fig. 4. The head of the pintle is centered by the frame S relatively to the tubular leg. The lower end of the pintle is provided with a leg mount M of a size to surround and approximately fit the leg L, as shown in Fig. 1. It also fits and is centered by the pintle P. It is retained from being accidentally drawn off the pintle when the caster is not in the leg by means of ears or lugs E which are punched or otherwise formed on the surface of the pintle. The collar C, which may be either integral with or loose upon the pintle P, forms a shoulder that supports the leg mount M. Preferably the entire weight of the leg rests upon the disk portion of the leg mount and is transmitted to the collar C and thence to the jaws J instead of having the weight of the leg hang upon the socket S and be transmitted therefrom to the head of the pintle P. But in the more generic aspect of the invention I do not wish to be limited to the form of socket nor to the other exact details described, as will be apparent from the claims.

In Fig. 5 the disk D, which may be of steel or other strong metal, is shown underlying and strengthening the leg mount M, which may be of relatively soft and weak brass. Such variations do not, of course, affect the substance of the invention.

In using the caster the socket is first thrust into place in the leg, usually separately from the pintle, in which case the pintle is afterwards thrust into place, its head passing between and being retained by the springs T so as to secure it to the socket and prevent its dropping out, while the leg mount M at the lower end passes over and embraces the end of the leg so that the caster is held and substantially centered in the leg and is adapted to support the weight and strains that may come upon the leg.

By the expression "socket" I do not mean to exclude forms thereof which would be ordinarily known in this art as frames rather perhaps than sockets, on account of their general shape. Open frames are, for example, shown in my own prior patents 645,387 and 643,482, and obviously these could be provided with the detachable pintle-holding means and with the other features described and claimed herein and utilized for the same purpose as the form of socket here illustrated.

Without attempting to illustrate other forms of the sockets or the other parts that may be substituted for those shown, without departing from the principles of the invention, I claim and desire to secure the following:

1. A cluster having a pintle and a detachable socket for tubular legs, the socket of which has means for preventing its being thrust too far into the leg and is adapted to be frictionally retained in the leg and to hold the pintle, and the pintle of which is provided with a combined leg-supporting member and leg mount which is adapted to surround and center the foot of the leg.

2. A caster for tubular legs having a pintle a socket adapted to be held in the leg and which detachably and separably secures the pintle to itself (the socket) and thereby to the leg, and having a leg mount which surrounds and centers the end of the leg relatively to the pintle.

3. A caster having a leg mount secured to its pintle and a socket detachably holding the pintle and adapted to fit and be held within the interior of a tubular leg.

In testimony whereof I have signed this specification in the presence of two subscribing witnesses, April 29, 1908.

ALBERT B. DISS.

Witnesses:
HAROLD BINNEY,
E. VAN ZANDT.

---

Correction in Letters Patent No. 911,213.

It is hereby certified that in Letters Patent No. 911,213, granted February 2, 1909, upon the application of Albert B. Diss, of Newark, New Jersey, for an improvement in "Casters for Tubular Legs for Furniture," an error appears in the printed specification requiring correction, as follows: In line 16, page 2, the word "cluster" should read *caster*; and that the said Letters Patent should be read with this correction therein that the same may conform to the record of the case in the Patent Office.

Signed and sealed this 16th day of March, A. D., 1909.

[SEAL.]

C. C. BILLINGS,
*Acting Commissioner of Patents.* perhaps than sockets, on account of their general shape. Open frames are, for example, shown in my own prior patents 645,387 and 643,482, and obviously these could be provided with the detachable pintle-holding means and with the other features described and claimed herein and utilized for the same purpose as the form of socket here illustrated.

Without attempting to illustrate other forms of the sockets or the other parts that may be substituted for those shown, without departing from the principles of the invention, I claim and desire to secure the following:

1. A cluster having a pintle and a detachable socket for tubular legs, the socket of which has means for preventing its being thrust too far into the leg and is adapted to be frictionally retained in the leg and to hold the pintle, and the pintle of which is provided with a combined leg-supporting member and leg mount which is adapted to surround and center the foot of the leg.

2. A caster for tubular legs having a pintle, a socket adapted to be held in the leg and which detachably and separably secures the pintle to itself (the socket) and thereby to the leg, and having a leg mount which surrounds and centers the end of the leg relatively to the pintle.

3. A caster having a leg mount secured to its pintle and a socket detachably holding the pintle and adapted to fit and be held within the interior of a tubular leg.

In testimony whereof I have signed this specification in the presence of two subscribing witnesses, April 29, 1908.

ALBERT B. DISS.

Witnesses:
HAROLD BINNEY,
E. VAN ZANDT.

---

It is hereby certified that in Letters Patent No. 911,213, granted February 2, 1909, upon the application of Albert B. Diss, of Newark, New Jersey, for an improvement in "Casters for Tubular Legs for Furniture," an error appears in the printed specification requiring correction, as follows: In line 16, page 2, the word "cluster" should read *caster*; and that the said Letters Patent should be read with this correction therein that the same may conform to the record of the case in the Patent Office.

Signed and sealed this 16th day of March, A. D., 1909.

[SEAL.]

C. C. BILLINGS,
*Acting Commissioner of Patents.*

Correction in Letters Patent No. 911,213.

It is hereby certified that in Letters Patent No. 911,213, granted February 2, 1909, upon the application of Albert B. Diss, of Newark, New Jersey, for an improvement in "Casters for Tubular Legs for Furniture," an error appears in the printed specification requiring correction, as follows: In line 16, page 2, the word "cluster" should read *caster;* and that the said Letters Patent should be read with this correction therein that the same may conform to the record of the case in the Patent Office.

Signed and sealed this 16th day of March, A. D., 1909.

[SEAL.]

C. C. BILLINGS,
*Acting Commissioner of Patents.*